Aug. 2, 1960

M. G. BODMER 2,947,907

TRAVELING WAVE TUBE

Filed Dec. 31, 1958

INVENTOR
M. G. BODMER
BY David P. Kelley
ATTORNEY 2,947,907

TRAVELING WAVE TUBE

Max G. Bodmer, Millington, N.J., assignor to Bell Telephone Laboratories, Incorporated, New York, N.Y., a corporation of New York Filed Dec. 31, 1958, Ser. No. 784,314

16 Claims. (Cl. 315—3.5)

This invention relates to traveling wave tubes, and more particularly, to structure for supporting the wave propagation circuit or helix of such tubes.

The traveling wave tube, in perhaps its most common form, utilizes a conductive helix as the slow wave circuit, inasmuch as a helix lends itself readily to precision winding techniques, permits the attainment of effective wave retardation characteristics, is compatible with various types of coupling arrangements, exhibits an extremely wide frequency bandwidth because of its nondispersive forward wave characteristics, and permits effective disposition of the beam current over the cross-section of the circuit.

Since the electromagnetic wave velocity must be reduced to a value appreciably less than the speed of light in order that the wave and beam may be in synchronous relation for maximizing the interchange of energy therebetween at reasonable values of beam voltage, a wire helix of extremely fine dimensions becomes necessary at very high frequencies. For example, even in a traveling wave tube designed for high power applications at a relatively low mid-band frequency of 11 kmc., with a beam voltage of 10 kv., a helix with a wire diameter of 20 mils, an inside diameter of 100 mils and a pitch of 70 mils is advantageously utilized. These dimensions, coupled with the fact that such helices often have a length ranging from 50 to 300 times their diameter, make such helices very fragile. The helix dimensions, of course, become extremely minute when the helix is designed for extremely high frequency, low gain applications, such as in the 6 mm. wave range.

It thus becomes apparent that virtually all of the helices utilized in traveling wave tubes, and certainly those designed for high frequency operation, are, because of their small dimensions, very fragile and incapable of self support. Accordingly, a more rigid support structure for the helix is required in order to provide suitable rigidity during fabrication as well as permanent placement of the helix thereafter.

For efficient high power operation extremely accurate positioning of the helix is required in order to prevent impingement of electrons, thereby impairing the beam transmission efficiency as well as seriously impairing the operation of the device, if not rendering the device inoperative, due to the excessive heat generated. Concomitantly, even a tolerable amount of heat generated on th helix by either axial misalignment or distortion of the helix will result in a reduction from the maximum attainable efficiency of the device since the R.-F. loss of a conductive helix increases directly with its operating temperature. An extremely effective heat conductive path and heat sink is required, therefore, to keep the operating temperature of the helix at a minimum value. Moreover, it is desired that accurate alignment and cooling of the helix may be accomplished with a support arrangement of substantially open design permitting easier measurement of helix straightness as well as the utilization of coaxial beam flow. In addition, pitch uniformity of the helix, particularly at very high frequencies, becomes quite critical since precise phase relationships must be observed at successive turns in order to obtain reasonable efficiencies resulting from the interaction between the beam and the normally weak R.-F. fields set up by a wave propagating along the minutely dimensioned helix. This necessitates that the helix be supported by a structural arrangement which minimizes transverse stress, such as set up by multi-contact helix supports, which tend to distort or weaken the supporting bonds. Moreover, and very importantly, when longitudinally extending insulative helix support arrangements which are bonded to the helix are in turn supported by a non-magnetic conductive cylinder such as the envelope of the tube so as to provide an effective heat sink, it is desirous to bond the insulative structure to the conductive supporting structure so as to insure effective heat transfer thereto in a manner which will also effect a uniform operating temperature along the helix. However, this requires means for compensating for the dissimilarity of the coefficients of thermal expansion of such materials, for otherwise the excessive tensile strains exerted on the insulative support structure after cooling down to room temperature from that required for bonding will cause it to break. This of course would seriously distort the helix, adversely affect the dielectric loading of the helix and either weaken or break the bonds between the helix and the insulative support structure as well as the bonds between the latter and the conductive cylinder. The dissimilarity of the coefficients of thermal expansion becomes particularly pronounced when the insulative material is of sapphire or a material exhibiting similar characteristics, desired because of its excellent heat conduction and low R.-F. loss properties, and the conductive material is of molybdenum or material exhibiting similar characteristics, desired to support the insulative structure and possibly to form a portion of the envelope because of its non-magnetic properties as well as good heat dissipating characteristics. Accordingly, heretofore, even if the bond between these materials could be made strong, it would normally result in the insulative support structure breaking irregularly because the tensile strength of the insulative material would be exceeded upon cooling down to room temperature from the high temperatures necessarily required during the bonding process. Similarly, it is desired that there be means to minimize axial movement of the critically positioned coupling ends of the helix which may result from axial expansion of a solid insulative support member bonded to a helix at high operating temperatures.

None of the helix support structures utilized heretofore has satisfactorily exhibited all of the desired characteristics mentioned above simultaneously. One of the two basic conventional forms of helix support has comprised a single hollow cylinder of insulative material surrounding the helix and often comprising the envelope of the device. A modification of this arrangement has comprised a large support member having a polygonally shaped central aperture. The second basic type of helix support structure priorly utilized comprises two or more insulative support rods uniformly spaced in a symmetrical manner about the periphery of the helix and extending along the helix in a direction parallel to the axis thereof.

In both of the above-described helix support arrangements, the helix is normally either bonded, as by glazing, to the support members or frictional forces and/or mechanical clamping is relied upon to hold it in place. Disadvantageously, with both of these arrangements, helix straightness and alignment depend primarily upon accurate dimensioning of a number of interrelated elements or longitudinally extending rib-like points of contact such as formed with a hollow member having a polygonally shaped central aperture. Moreover, when the helix is bonded to a multi-rod arrangement, it is very difficult to try to fit the helix and rods within a mounting member, such as the envelope, without introducing appreciable transverse stress between the helix and the rods that tends to distort or weaken the supporting bonds. Similarly, the dissimilar coefficients of thermal expansion that exist between solid insulative support rods and a non-magnetic conductive outer supporting member, such as the envelope, negative the possibility of glazing the rods to the conductive member to effect better heat transfer thereto. In addition, such structures as described above, by encompassing the periphery of the helix, do not allow for easy measurement of helix straightness or permit the utilization of confined coaxial beam flow whereby one portion of the beam is within and another portion is without a major portion of the periphery of the helix which would effect a substantial increase in signal gain as well as an improvement in the signal-to-noise ratio at very high frequencies.

Accordingly, it is an object of this invention to insure precise and rigid helix alignment during as well as after fabrication over a wide range of operating temperatures in high frequency traveling wave tubes.

It is another object of this invention to insure the retainment of pitch uniformity over a wide range of helix operating temperatures.

It is a further object of this invention to insure precise and rigid helix alignment with pitch uniformity over a wide range of temperatures while supporting the helix in a manner which is simultaneously conducive to the measurement of helix straightness, the utilization of coaxial beam flow and the transfer of thermal power from the helix to a suitable heat sink through a very effective thermal conductance path.

It is still another object of this invention to apply D.-C. voltage to the helix through portions of the same either spot-weld techniques or applied loss coatings forming a portion of the conductive path.

It is an additional object of this invention to transfer thermal power away from a fragile helix and to apply D.-C. volatge to the helix through portions of the same structural arrangement utilized to support the helix.

In a specific illustrative embodiment of my invention, an electron discharge device of the traveling wave type comprises an evacuated envelope, an elongated slow wave helical conductor divided into two sections disposed longitudinally within the envelope and supported in part by two insulative support rod members extending along a line parallel to the axes of and bonded to successive turns of the two helical sections, an electron gun and target positioned beyond opposite ends of the helical sections for forming and projecting an electron beam along an extended path in close proximity to the helical sections, signal input and output coupling circuits at the extreme ends of the helical sections, respectively, and a magnetic focusing system for establishing a longitudinal magnetic focusing field along the path of electron flow and characterized by a single direction reversal in the region intermediate the two helical sections. For convenience hereinafter, the expression "helical sections" will be interchangeably referred to as simply "helices" or singularly as "helix."

In accordance with one feature of my invention, precise axial alignment, rigidity, and pitch uniformity of the helices are assured by a support arrangement for each helix including a single sectionalized insulative support rod mounted in a longitudinally extending groove of a rigid metal block, which preferably forms a portion of the envelope and provides an effective heat sink. Significantly, by sectionalizing each of the insulative support rods into a beaded array, there are avoided the excessive tensile strains normally experienced with a solid insulative support rod, such as sapphire, when bonded at a high temperature to a non-magnetic conductive material, such as molybdenum, which strains often cause irregular breaking of the rod as well as the bond upon cooling. The discrete sections or segments forming the beaded arrays in axial alignment are dimensioned and spaced such that successive turns of the corresponding helix coincide with and are glazed to an intermediate portion of successive ones of the insulative beaded support rod segments. With the individual segments thus dimensioned and spaced, they do not interfere with the uniform dielectric loading of the individual turns of the helix which they support. In addition, a structure in accordance with my invention inhibits backward wave oscillations in a given frequency range, where the helix has about two turns per wavelength, since a single sectionalized beaded helix support rod per helix effectively loads the helix periodically, once at each turn which results in a proper amount of power being reflected at every half wavelength, a condition utilized for producing a stop band at the backward wave frequencies associated with the beam voltage needed for forward wave interaction. Of course, applied loss coatings, such as Aquadag, may be deposited on certain of the beaded insulative segments in order to obtain any desired degree of attenuation. Further, the single sectionalized helix support rod arrangement also minimizes the tendency of the helix to be overconstrained, as well as allowing easier measurement of helix straightness and permitting the utilization of coaxial beam flow.

When two distinct helices are utilized and separated from each other along a common axis, such as in a specific embodiment of my invention, a tapered dielectric sleeve of lossy material may advantageously be utilized to minimize wave reflections at the respective adjacent ends of the helices.

In accordance with another feature of my invention, one or more of the beaded support rod segments for each helix are made of conductive material which permits D.-C. voltage to be readily applied to the fragile helices. Such conductive beaded segments are dimensioned to support at least one and preferably two successive end turns of each helix employed so as to insure reliable and permanent contact with each helix at all times.

A complete understanding of this invention and of these and other features thereof may be gained from consideration of the following detailed description taken in conjunction with the accompanying drawing, in which.

Figure 1:
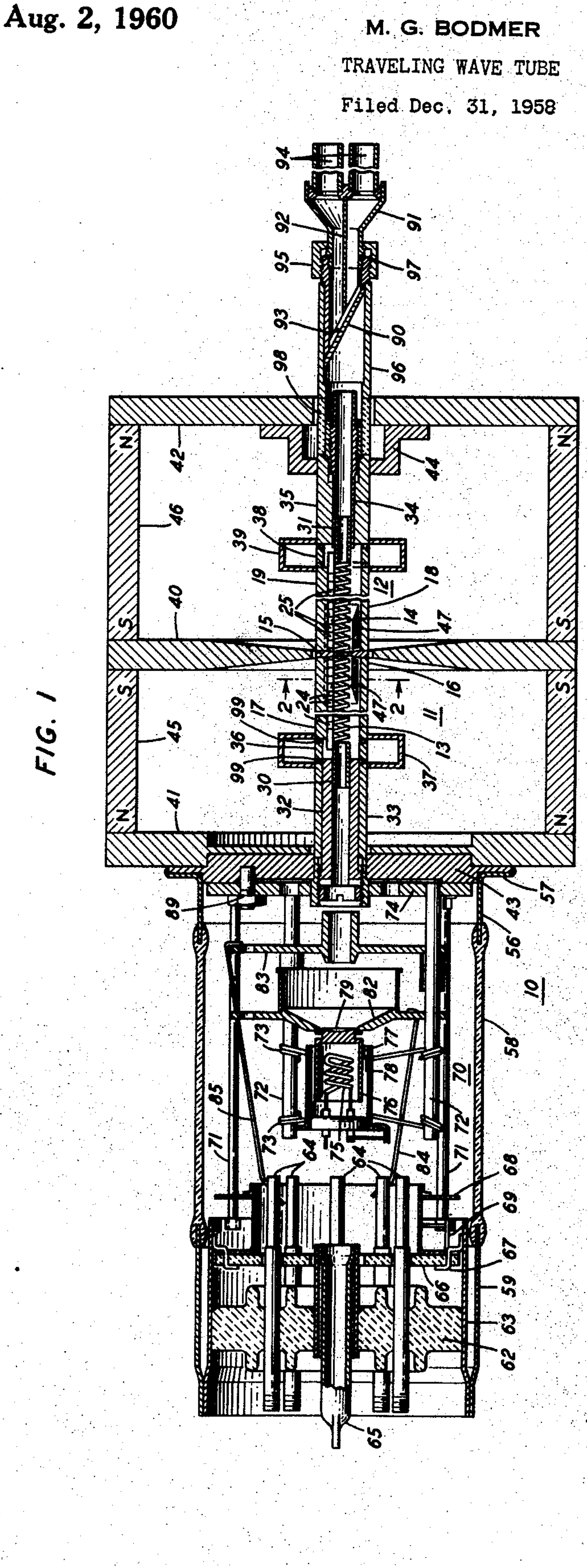
Fig. 1 is a sectional view of a high power traveling wave tube amplifier illustrative of one specific embodiment of this invention.
Figure 3:
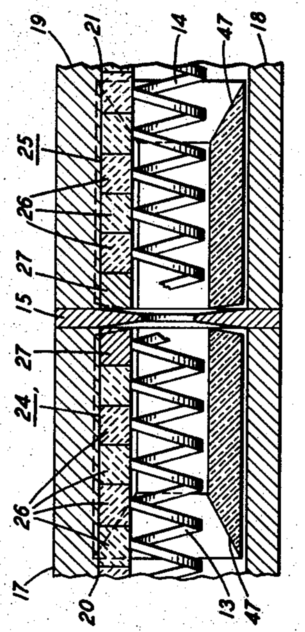
Fig. 3 is a partial sectional view in detail of the sectionalized helix support structure also depicted in Fig. 1.
Figure 2:
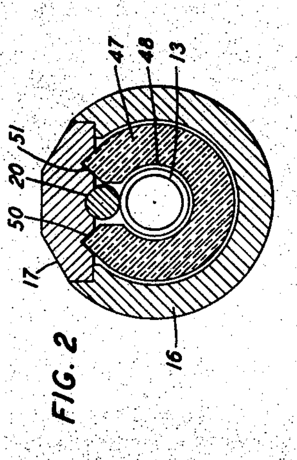
Fig. 2 is a cross-sectional view of the helix support structure depicted in Fig. 1.

Referring now to Fig. 1, there is a depicted a traveling wave tube 10, comprising two elongated central conductive envelope portions 11 and 12, preferably of non-magnetic material such as copper or molybdenum, extending the length of two conductive helical sections 13 and 14, respectively, on either side of a central pole-piece member 15. Conductive envelope portions 11 and 12 are each comprised of two sections, 16, 17 and 18, 19, respectively, as best seen in Figs. 2 and 3. Central envelope portions 17 and 19, referred to hereinafter as the conductive blocks, are characterized by having substantially large cross-sectional areas so as to form effective heat sinks for dissipating the thermal power generated on helical sections 13 and 14, respectively. An accurately machined groove 20, Fig. 2, extends longitudinally along the center of the inner surface of the conductive block 17 with a similar groove 21 seen in Fig. 3, extending longitudinally of the conauctive block 19.

In accordance with an aspect of this invention, helical sections 13 and 14 are supported, in part, by sectionalized insulative support rod arrays 24 and 25, respectively, on either side of the center pole-piece member 15, best seen in Fig. 3. Sectionalized support rod arrays 24 and 25 are each comprised of a plurality of discrete insulative segments 26 mounted in the grooves 20 and 21, of conductive blocks 17 and 19, respectively, and are secured thereto, as by glazing.

In order not to interfere with the dielectric loading of the helical sections, the insulative support rod segments 26 are dimensioned and spaced along grooves 20 and 21 such that successive turns of the respective helical sections coincide with and are glazed to an intermediate portion of successive ones of the support rod segments. Segments 26 are preferably made out of sapphire as this material exhibits excellent heat conduction characteristics as well as good low R.-F. loss properties; however, any other insulative material exhibiting similar characteristics may be utilized. Advantageously, by sectionalizing the respective support rods into beaded arrays 24 and 25, the excessive tensile strains normally experienced during wide temperature variations with a solid support rod are avoided. This type of helix support arrangement also effectively loads the helix periodically at every turn in a manner which is conductive to inhibiting backward wave oscillations. Similarly, the utilization of a single sectionalized support rod per helix minimize overconstraining of the helix, allows for easier measurement of helix straightness and permits the utilization of coaxial beam flow.

In accordance with another aspect of this invention, a conductive beaded support rod segment 27, best seen in Fig. 3, is mounted in each of the grooves 20 and 21 of the conductive blocks 17 and 19 and coincides, respectively, with one or more end turns of helical sections 13 and 14 adjacent the inner pole-piece member 15. The conductive segments 27 provide an effective way to apply D.-C. voltage to the fragile helical sections while simultaneously providing support therefor. The conductive segments 27 are brazed to the helix and conductive block with which they are in contact in a manner similar to that utilized for the insulative support rod segments 26. Any suitable conductive material may be utilized for the support rod segments 27 as long as it exhibits a coefficient of thermal expansion similar to the material utilized for the helix and conductive block with which it is in contact. It may be desirous with certain glazing materials and methods of application, to machine transverse grooves across the longitudinally extending grooves 20 and 21 of the conductive blocks 17 and 19 in those regions where support rod segments 26 and 27 abut each other successively so as to form regions where an excessive amount of glazing material may secrete when the beaded segments are lightly compressed during fabrication.

Signal input and output antenna couplers 30 and 31 are connected respectively to the opposite ends of helical sections 13 and 14 furthest removed from each other. These couplers preferably comprise end extensions of helical sections 13 and 14 which are tightly wound with adjacent turns thereof being brazed together to form solid cylindrical antenna couplers integral with the respective slow wave helical sections; such antenna couplers are disclosed in J. B. Little Patent 2,716,202, issued August 23, 1955. An adjustable input coupling sleeve 32 at one end surrounds the input antenna coupler 30 and permits the input coupling impedance match to be optimized. Axial movement of the coupling sleeve 32 is accomplished by mutually threaded end portions of coupling sleeve 32 and a conductive envelope section 33. A similar adjustable output coupling sleeve 34 at one end surrounds the output antenna coupler 31 with the other end of coupling sleeve 34 being mutually threaded with an end portion of a conductive envelope section 35. An input ceramic window 36 is capacitively coupled to an outer wave guide section 37, shown in cross-section, while a ceramic output window 38 is capacitively coupled to an output wave guide section 39 for effecting signal energy transfer to and from the tube 10. It is to be understood of course that the wave guide sections are shown only by way of example, and that other well known types of transmission line arrangements may be utilized with equal effectiveness.

The requisite magnetic focusing field for confining the electron flow through both helical sections 13 and 14 is established with a permanent magnetic structure comprising an annular pole-piece member 40 intermediate two annular pole-piece members 41 and 42 of high permeability material. Annular pole-piece member 41 is supported by an end plate member 43 and annular pole-piece member 42 is supported by a suitable bracket 44 attached thereto and apertured to encompass the conductive envelope section 35. The annular pole-piece members 40, 41 and 42 are bridged by a plurality of permanent bar magnets 45 and 46 symmetrically displaced thereabout as shown in Fig. 1, although magnets of annular shape as well as other types may be utilized with equal effectiveness. Similarly, solenoids may be utilized to effect the requisite magnetic focusing field. The magnetic senses of the annular magnets 45 and 46 are advantageously reversed, thus permitting a substantial reduction in the weight of the focusing system in accordance with the principles of spatially alternating periodic focusing with long magnetic periods over that normally required with a conventional focusing field arrangement. The characteristics and advantages of such focusing are fully disclosed in J. R. Pierce Patents 2,841,739, 2,847,607 and 2,867,745, issued July 1, 1958, August 12, 1958, and January 6, 1959, respectively. By utilizing two helical sections separated along a common axis, this provides an ideal low R.-F. field region in which to effect a sudden single direction reversal of the otherwise continuous longitudinal magnetic focusing field. More particularly, by extending the inner central pole-piece member 15, which forms an extension of the annular pole-piece member 40, within the evacuated portion of the tube envelope and tapering it to a thin edge at the periphery of a central aperture through which the beam passes, distortion of the longitudinally extending flux lines of the magnetic field on either side of the reversal is minimized. This arrangement also results in the single field reversal being realized over a very short transition region which is desired in order to minimize beam perturbations or ripple with such a focusing system.

In order to terminate the uncoupled end of helical section 13 as well as to prevent any possible wave reflections at the adjacent ends of helical sections 13 and 14 caused by either the insertion of the inner pole-piece member 15 within the evacuated enclosure or because of any mismatches at the input or output coupling ends of helical sections 13 and 14, respectively, a partial cylindrical ceramic sleeve 47 of lossy material and having a tapered end, best seen in Figs. 2 and 3, is positioned to surround and be either close to or in contacting relation with a plurality of end turns of each of the helical sections 13 and 14 adjacent the inner pole-piece member 15. The lossy ceramic sleeves 47 are of a diameter slightly less than the inner diameter of conductive envelope sections 16 and 18; thus, the only critical dimension of the sleeves 47 is the inner bore 48, best seen in Fig. 2, which is dimensioned to have a diameter just slightly larger than the diameter of the helical sections 13 and 14. The open longitudinally extending outer edges of the tapered ceramic sleeves 47 abut against the sides of two accurately machined V-shaped grooves 50 and 51 in the conductive blocks 17 and 19, respectively, best seen in Fig. 2 and secured thereto, as by glazing or other means.

On the side of the end plate member 43 opposite the helical section 13 is another evacuated envelope portion comprising a short conductive ring member 56 having a flanged portion 57 brazed to the end plate member 43 with the end furthest removed therefrom fitting within a circular groove of a non-conductive envelope section 58 and brazed thereto. The opposite end of envelope section 58 is brazed to a conductive envelope end section 59. It is to be understood that envelope sections 56, 58 and 59 may all be of nonmagnetic conductive material if desired. Enclosing the extreme end of this evacuated portion of the tube 10 is a suitable insulative base 62, such as of glass or ceramic, or a combination thereof, brazed along the outer periphery to one end of a cylindrical support member 63, which in turn is brazed at one end to the conductive envelope section 59. Insulative base 62 supports a plurality of lead stem connections 64. For convenience and simplicity, the connections from a suitable voltage source through the lead stem connections 64 to the various tube elements are not shown. An exhaust tubulation 65 extends from the insulative base 62 allowing for the evacuation of the envelope after assembly of the tube elements described in greater detail hereinafter. A ceramic shadow plate 66, held in axial alignment by a plurality of support members 67 which in turn are brazed to the cylindrical support member 63, contributes to the support of the lead stem connections 64 as well as to prevent any conductive material from being deposited on the insulative base 62, such as by cathode sputtering which could cause arcing between any of the lead stem connections 64 having a large potential difference therebetween. A conductive U-shaped annular ring 68, with one side attached to the shadow mask 66 by means of the support members 67, partially encloses a suitable getter 69, utilized to absorb any residual gases, except for a small passage near the inner periphery of envelope section 58. This arrangement minimizes any of the getter material, such as barium or magnesium, for example, from being reflected back to the inner surface of the shadow mask 66 to the extent that arcing may develop between various lead stem connections 64 passing therethrough.

An electron gun assembly 70 for forming and projecting an electron beam along an extended path through the helical sections 13 and 14 is positioned between the end plate member 43 and the shadow mask 66. The gun assembly is held in axial alignment with respect to the interaction circuits by a plurality of support rods 71 and 72 together with two wire support elements 73. Support rods 71 and 72 are attached at one end to a gun alignment platform 74, with the opposite ends of support rods 71 being attached to the cylindrical support member 63. The electron gun assembly 70 comprises a heater element 75 enclosed by a conductive cathode sleeve 76. The heater element 75 and cathode sleeve 76 are positioned axially with respect to the helical sections 13 and 14 by a plurality of wire-like members 77 in contact with an outer conductive cylinder member 78. At the closed end of cathode sleeve 76 is the emitting surface 79 of the cathode and positioned in axial alignment therewith is a beam forming electrode 82 and an accelerating anode 83 both held in spaced relationship by the support rod members 71 and 72. Voltages are applied to the focusing and accelerating anodes from the lead stem connections 64 by wire leads 84 and 85, respectively. While the gun assembly 70 herein described is for solid cylindrical beam flow, it is to be understood that with the helices held in substantially free space relationship with respect to their surroundings in accordance with the principles of this invention, any of the known guns designed for coaxial beam flow may similarly be utilized.

The electron gun assembly 70 is advantageously arranged so that the entire unit is held in rigid alignment with respect to the axes of helical sections 13 and 14 by a plurality of fastening screws 89 arranged in a symmetrical circular manner near the outer edge of the gun alignment platform 74 and extending therethrough and threaded in tapped holes of the end plate member 43. With this arrangement, it becomes apparent that one can readily remove a defective electron gun assembly 70 by the simple expediency of reducing the vacuum and then removing the envelope sections 56 and 59 together with envelope section 58 attached thereto by known techniques and then removing the fastening screws 89 which attach the electron gun assembly 70 to the end plate member 43.

At the opposite end of the tube 10 from the electron gun 70 is an electron collector 90 positioned at an inclined angle with respect to the axis of the tube. This orientation of the collector 90 provides a larger surface area over which the electrons are collected and at the same time minimizes secondary emission effects.

A tubular chamber 91 is divided into two sections by a dividing member 92, the end of which is adjacent the central portion of the collector 90 defining a small gap 93. The exterior ends of each section of the divided tubular chamber 91 have a suitable hollow stem section 94 attached thereto for applying a recirculating coolant through the passage 93 adjacent the surface of the collector 90. A threaded lock nut 95, brazed to the tubular chamber 91, engages with the threaded end portion of a conductive envelope section 96, permitting the axial distance of the gap 93 to be adjusted which, correspondingly, varies the rate of flow of the coolant over the heated central surface area of the collector 90. A rubber gasket 97 assures that the coolant will not leak through the threaded portion between the lock nut 95 and the conductive envelope section 96. An insulative ceramic envelope section 98 between the conductive envelope sections 35 and 96 permits the collector assembly to be at a higher potential than other portions of the tube 10.

In fabricating the helix support assembly, the helical sections are wound upon a mandrel by any known method, with the mandrel being of a material such as copper, if the helical sections are of a material such as molybdenum, which would permit the mandrel to be dissolved by a chemical process before heat treatment. Alternatively, the mandrel may be of the same or similar material as the helical sections having approximately the same coefficient of thermal expansion if the mandrel is to support the helical sections during a subsequent normalizing heat-treating process so as to minimize distortion of the helix pitch.

Advantageously, in accordance with the principles of this invention, the sectionalized insulative support rod segments 26 do not have to match the coefficient of thermal expansion of either the helix or the conductive blocks to which they are bonded.

Glaze is then applied along the accurately machined grooves 20 and 21 of the conductive blocks 17 and 19 and the beaded support rod segments 26 are then mounted therein. Similarly, glaze is applied to the support rod segments 26 on the side opposite the conductive blocks so as to coincide with the area to be in contact with successive turns of the corresponding helical sections. This glaze may be applied by spraying or by any of the other known methods. The conductive support rod segments 27 are preferably brazed to the respective helix and conductive block section with which they are in contact.

The complete helix assembly is then positioned in a suitable jig, not here shown, which includes the conductive block sections 17 and 19 forming part of the envelope, the respective beaded support rod arrays 24 and 25 glazed thereto, together with the helical sections 13 and 14 positioned and glazed to the beaded arrays 24 and 25, respectively. Of course, the same fabrication procedure is equally applicable and less detailed if a single continuous helix were utilized and supported by a single sectionalized support rod and one continuous conductive envelope section. The helix assembly is then heat treated to normalize the stress set up in the helical sections during the winding process as well as to bond securely the helical sections to the support rod arrays and the latter to the conductive blocks by melting the glaze material. Of course it is to be understood that the beaded arrays could be glazed to the conductive blocks and the helical sections to the beaded arrays in separate steps if desired. The mandrel is then removed, if not previously removed, and the helical sections 13 and 14, beaded arrays 24 and 25 and conductive blocks 17 and 19, respectively, become integral units. If an applied loss coating such as Aquadag were desired to secure attenuating characteristics in addition to those realized with the tapered ceramic sleeves 47 of lossy material, or if a straight field focusing system with a continuous helix were desired, this coating would preferably also be applied to the helix at this stage of fabrication.

Conductive envelope section 33, the ceramic input window 36 and conductive envelope sections 16 and 17, with helical section 13 previously attached to the beaded array 24, are then placed and aligned in a suitable jig not here shown. One of the tapered ceramic sleeves 47 is then positioned coaxially about the end portion of helical section 13 followed by the positioning of the central inner pole-piece member 15. Conductive envelope sections 18 and 19, together with the helical section 14, previously attached to the beaded support rod array 25, together with the other tapered ceramic sleeve 47 positioned coaxially about the end portion of helical section 14 adjacent the pole-piece member 15, as well as the ceramic output window 38, envelope sections 35, 98 and 96 are all positioned and aligned in the jig and subsequently heated at a suitable temperature to braze the various sections together by any of the well known techniques. Platinum washers 99 are shown on either side of the input and output coupling windows 36 and 38, respectively, to effect a better thermal match between the coupling windows and the conductive sections of the tube envelope adjacent thereto; however, other known techniques may be utilized with equal effectiveness.

The tube envelope portions of smaller diameter, with the exception of the tubular chamber 91, thus brazed together, are inserted as an integral unit through a central aperture in the end plate member 43 with axial movement therealong restricted in part by an end collar on conductive envelope section 33 which abuts against the gun side of end plate member 43.

The gun assembly 70 including the gun alignment platform 74 may then be attached to the end plate member 43 and aligned with respect to the axes of the helical sections 13 and 14 by orienting the gun platform 74 to the proper position before securing it firmly to the end plate member 43 by means of the fastening screws 89. Envelope sections 56, 58 and 59 are then positioned to enclose the gun assembly 70 and brazed together forming a sealed enclosure. The various flanges, regions of overlap between the various conductive envelope sections and points at which the envelope sections are abutting the end plate member 43 may be welded together, such as by the heliarc process. The tubular chamber 91 is then attached to the collector end of the tube 10.

From the foregoing it can be seen that the unique single sectionalized helix support rod arrangement disclosed herein avoids the high tensile strains normally experienced with one or more solid support rods when bonded at high temperatures to a non-magnetic conductive material with a different coefficient of thermal expansion, which strains often cause irregular breaking of the rod as well as the bonds between both the helix and the rod and the rod and its support when cooled. Moreover, by making one of the sectionalized support rod segments conductive, a D.-C. path is provided for applying voltage to a fragile helix. In addition, with the helix supported in substantially free-space relationship with respect to its surroundings along a single line parallel to the axis of the helix, backward wave oscillations are inhibited at certain predetermined frequencies, overconstraining of the helix is minimized, easier measurement of helix straightness is effected and the utilization of coaxial beam flow is permitted.

It is to be understood that the specific embodiment disclosed and the method of fabrication described herein are merely illustrative of the principles of the instant invention. Numerous other arrangements and variations in fabrication could be devised by those skilled in the art without departing from the spirit or scope of this invention.

What is claimed is:

1. A traveling wave tube comprising an evacuated envelope, means including an electron gun for forming and projecting an electron beam along an extended path, a slow wave propagation circuit positioned along said path, means for supporting said slow wave circuit, said supporting means including an insulative support rod divided into a plurality of discrete segments in axial alignment with and glazed to said slow wave circuit along a line parallel to the axis thereof, and a conductive block having means for aligning said support rod sections, said aligning means comprising a groove extending longitudinally of said conductive block and in which said sections are mounted.

2. A traveling wave tube in accordance with claim 1 wherein said wave propagation circuit comprises a helix and said insulative support rod segments are dimensioned and spaced such that successive turns of said helix coincide with and are glazed to an intermediate portion of successive ones of said support rod segments.

3. A traveling wave tube in accordance with claim 1 wherein said conductive block comprises a portion of said envelope and said means for supporting said slow wave circuit further includes a conductive support rod segment mounted in said longitudinally extending groove in axial alignment with said insulative segments for providing a conductive path through which voltage is applied to said slow wave circuit.

4. A traveling wave tube comprising an evacuated envelope, means including an electron gun for forming and projecting an electron beam along an extended path, a slow wave helix positioned along said path, means for supporting said helix, said supporting means including an insulative support rod divided into a plurality of discrete segments in axial alignment, said segments being dimensioned and spaced such that successive turns of said helix coincide with and are glazed to an intermediate portion of successive ones of said support rod segments, and a conductive block comprising a portion of said envelope and having means for aligning said support rod segments, said aligning means comprising a groove extending longitudinally of said conductive block and in which said segments are mounted.

5. A traveling wave tube in accordance with claim 4 wherein said means for supporting said slow wave helix further includes a conductive support rod segment mounted in said longitudinally extending groove in axial alignment with said insulative segments for providing a conductive path through which voltage is applied to said helix.

6. A traveling wave tube comprising an evacuated envelope, means including an electron gun for forming and projecting an electron beam along an extended path, a slow wave helix positioned along said path, signal input coupling means connected to the end of said helix nearest the gun, means for supporting said helix, said supporting means including an insulative support rod divided into a plurality of discrete segments in axial alignment, said segments being dimensioned and spaced such that successive turns of said helix coincide with and are glazed to an intermediate portion of successive ones of said support rod segments, said last mentioned means further including a conductive support rod segment in axial alignment with said insulative segments for providing a conductive path through which voltage is applied to said helix, and a conductive block comprising a portion of said envelope and having means for aligning said support rod segments, said aligning means comprising a groove extending longitudinally of said conductive block and in which said sections are mounted.

7. A traveling wave tube comprising an evacuated envelope, means including an electron gun for forming and projecting an electron beam along an extended path, a first slow wave helix positioned along said path, a second slow wave helix positioned along said path and spaced from said first slow wave helix, means for supporting said first and second slow wave helices, said supporting means including an insulative support rod for each helix divided into a plurality of discrete segments in axial alignment, said segments being dimensioned and spaced such that successive turns of said first and second helices coincide with and are glazed to an intermediate portion of successive ones of said respective support rod segments, and two conductive blocks comprising portions of said envelope and having means for aligning said support rod segments, said aligning means comprising a groove extending longitudinally of each of said conductive blocks and in which said segments for supporting said first and second helices are respectively mounted.

8. A traveling wave tube in accordance with claim 7 wherein said means for supporting said first and second slow wave helices further includes a conductive support rod segment mounted in each of said grooves of said conductive blocks which coincides with at least one adjacent end turn of each of said first and second helices for providing a conductive path through which voltage is applied thereto.

9. A traveling wave tube in accordance with claim 8 further comprising input and output signal coupling means connected to the opposite ends of said first and second helices furthest removed from each other, respectively, means for terminating the ends of said first and second helices adjacent each other to be substantially reflectionless, said terminating means comprising a partial cylindrical sleeve of lossy material positioned coaxially about and contiguous with a plurality of turns near the end to be terminated of each of said first and second helices, each of said sleeves being tapered on the end furthest removed from the other of said sleeves, and means for aligning and supporting said sleeves, said aligning means comprising a longitudinally extending outer groove on either side of said groove supporting said support rod segments in each of said conductive blocks, the open longitudinally extending edges of each of said sleeves coinciding with and being mounted in said outer grooves of the corresponding conductive member.

10. For use in a traveling wave tube having an evacuated envelope and utilizing a wave propagation circuit, means for supporting said circuit, said means comprising a conductive member having a groove extending longitudinally thereof and an insulative support rod divided into a plurality of discrete segments mounted in said groove with said slow wave propagation circuit bonded to said support rod segments.

11. For use in a traveling wave tube, the combination as set forth in claim 10 wherein said slow wave circuit comprises a helix, said conductive member comprises a portion of the evacuated envelope and said discrete segments are dimensioned and spaced such that successive turns of said helix coincide with and are glazed to an intermediate portion of successive ones of said support rod segments.

12. For use in a traveling wave tube, the combination as set forth in claim 11 further comprising a conductive support rod segment mounted in said groove and coinciding with and brazed to an end turn of said helix.

13. For use in a traveling wave tube utilizing a helix, means for supporting said helix, said means comprising a conductive member having a groove extending longitudinally thereof and an insulative support rod divided into a plurality of discrete segments, a portion of each of said segments being bonded to said conductive member along the groove thereof with said segments being dimensioned and spaced along said groove such that successive turns of said helix coincide with and are glazed to an intermediate portion of successive ones of said support rod segments.

14. For use in a traveling wave tube, the combination as set forth in claim 13 for further comprising a conductive suport rod segment brazed to said conductive member along said groove and coinciding with and brazed to at least two or more end turns of said helix.

15. A traveling wave tube comprising an envelope having a metallic portion with an internal groove extending therein parallel to the axis of said envelope, a plurality of individual insulator members mounted in said groove adjacent each other, a helical wire interaction circuit having each turn thereof secured to a distinct one of said members, and means for projecting an electron beam within said envelope adjacent said circuit.

16. A traveling wave tube in accordance with claim 15 wherein said members are of sapphire and each of said members is cylindrically shaped.

References Cited in the file of this patent

UNITED STATES PATENTS

| | | |
|---|---|---|
| 2,790,926 | Morton | Apr. 30, 1957 |
| 2,853,642 | Birdsall et la. | Sept. 23, 1958 |
| 2,853,644 | Field | Sept. 23, 1958 |

FOREIGN PATENTS

| | | |
|---|---|---|
| 780,107 | Great Britain | July 31, 1957 |